(12) United States Patent
Kawagoe

(10) Patent No.: US 11,997,440 B2
(45) Date of Patent: May 28, 2024

(54) MANAGEMENT DEVICE AND CALCULATION METHOD

(71) Applicant: MATSUI MFG. CO., LTD., Osaka (JP)

(72) Inventor: Akira Kawagoe, Tokyo (JP)

(73) Assignee: MATSUI MFG. CO., LTD., Osaka (JP)

( * ) Notice: Subject to any disclaimer, the term of this patent is extended or adjusted under 35 U.S.C. 154(b) by 253 days.

(21) Appl. No.: 17/512,011

(22) Filed: Oct. 27, 2021

(65) Prior Publication Data

US 2022/0138702 A1 May 5, 2022

(30) Foreign Application Priority Data

Oct. 29, 2020 (JP) .................. 2020-181941
Oct. 29, 2020 (JP) .................. 2020-181942

(51) Int. Cl.
| | |
|---|---|
| *G06Q 30/00* | (2023.01) |
| *B29C 33/70* | (2006.01) |
| *B29C 45/17* | (2006.01) |
| *B29C 45/76* | (2006.01) |
| *G06Q 10/0631* | (2023.01) |
| *G06Q 10/20* | (2023.01) |
| *H04Q 9/02* | (2006.01) |

(52) U.S. Cl.
CPC .............. *H04Q 9/02* (2013.01); *B29C 33/70* (2013.01); *B29C 45/1774* (2013.01); *B29C 45/76* (2013.01); *G06Q 10/06314* (2013.01); *G06Q 10/20* (2013.01); *B29C 2033/705* (2013.01)

(58) Field of Classification Search
None
See application file for complete search history.

(56) References Cited

U.S. PATENT DOCUMENTS

| | | | |
|---|---|---|---|
| 8,744,608 B2 | 6/2014 | Ohishi et al. | |
| 2007/0288306 A1* | 12/2007 | Ohishi | G06Q 10/06 700/95 |
| 2010/0044898 A1* | 2/2010 | Yamada | B29C 43/58 425/139 |

(Continued)

FOREIGN PATENT DOCUMENTS

| | | |
|---|---|---|
| JP | H03124417 A | 5/1991 |
| JP | H0679766 A | 3/1994 |

(Continued)

OTHER PUBLICATIONS

English Machine translation of JPH072018, Publication Date: Jan. 13, 1995.

(Continued)

*Primary Examiner* — Matthew T Sittner
(74) *Attorney, Agent, or Firm* — Millen, White, Zelano & Branigan P.C.; William F. Nixon

(57) ABSTRACT

Provided is a management device capable of communicating with a counting device that counts the number mold opening and closing cycles. The management device includes a memory and a processor. The processor outputs one or more index values that can be used for determining a next maintenance timing, by using a first value that is a count value acquired from the counting device, and one or more second values that are count values, at a last maintenance time, stored in the memory.

5 Claims, 12 Drawing Sheets

(56) References Cited

U.S. PATENT DOCUMENTS

| | | | |
|---|---|---|---|
| 2012/0136692 A1* | 5/2012 | Ohishi | G06Q 10/06316 |
| | | | 700/99 |
| 2012/0231103 A1* | 9/2012 | Catoen | B29C 45/17 |
| | | | 425/150 |
| 2014/0225292 A1* | 8/2014 | Starkey | B29C 45/76 |
| | | | 264/40.1 |
| 2018/0010986 A1* | 1/2018 | Matsuo | G06Q 30/016 |
| 2019/0377334 A1* | 12/2019 | Nakamura | G06Q 10/04 |

FOREIGN PATENT DOCUMENTS

| | | | |
|---|---|---|---|
| JP | H06328458 A | 11/1994 |
| JP | H072018 U | 1/1995 |
| JP | H0728522 A | 1/1995 |
| JP | H081725 A | 1/1996 |
| JP | 2002292709 A | 10/2002 |
| JP | 2003094487 A | 4/2003 |
| JP | 2007328677 A | 12/2007 |

OTHER PUBLICATIONS

Notice of Reasons for Refusal in corresponding JP2020-181941 drafted Mar. 21, 2024 (pp. 1-3) and English translation thereof (pp. 1-5).

\* cited by examiner

MANAGEMENT DEVICE AND
CALCULATION METHOD

TECHNICAL FIELD

The present disclosure relates to a management device and a calculation method. This application claims priority on Japanese Patent Application No. 2020-181941 filed on Oct. 29, 2020 and Japanese Patent Application No. 2020-181942 filed on Oct. 29, 2020, the entire contents of which are incorporated herein by reference.

BACKGROUND ART

As for molding using a mold, maintenance of the mold should be performed before a problem occurs, in order to avoid occurrence of a defective molded product. Therefore, the maintenance needs to be performed at an appropriate timing.

SUMMARY OF INVENTION

However, conventionally, a timing of maintenance has been determined by manually calculating the number of shots (number of times of use) for each mold. Therefore, management of molds is very complicated. Moreover, removing a mold from a molding device or replacing a mold depending on desired molded products may make the management more complicated and/or erroneous. Therefore, a management device capable of easily determining an appropriate timing for maintenance without requiring complicated operations, has been desired.

According to an embodiment, a management device is capable of communicating with a counting device configured to obtain a count value of a number of shots of a mold, and includes a memory and a processor. The processor is configured to execute a calculation process of calculating one or more index values by using a first value and one or more second values. The first value is the count value acquired from the counting device, and the one or more second values are reference values that are stored in the memory and are used for determining a next maintenance time. The one or more index values are able to be used for determining the next maintenance time.

According to another embodiment, a calculation method is a calculation method for a management device capable of communicating with a counting device configured to obtain a count value of a number of shots of a mold. The calculation method includes calculating one or more index values by using a first value and one or more second values. The first value is the count value acquired from the counting device, and the one or more second values are reference values that are stored in a memory and are used for determining a next maintenance time. The one or more index values are able to be used for determining the next maintenance time.

Further details will be described later as an embodiment.

DESCRIPTION OF EMBODIMENTS

Figure 1:
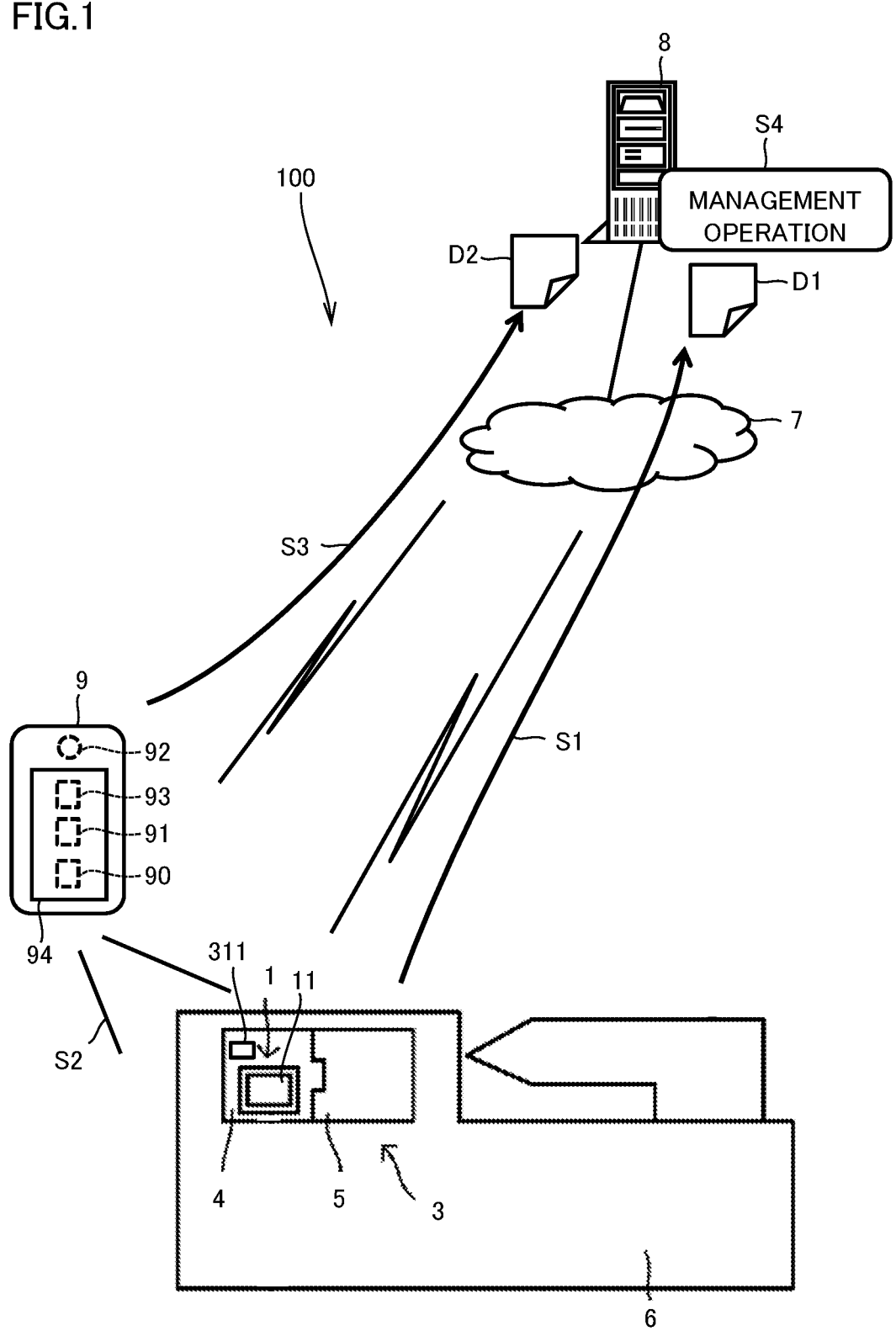
FIG. 1 shows a configuration of a management system, and a flow of a management operation in the management system.

<1. Outlines of Management Device and Calculation Method>

(1) A management device according to the present embodiment is capable of communicating with a counting device configured to obtain a count value of a number of shots of a mold, and includes a memory and a processor. The processor is configured to execute a calculation process of calculating one or more index values by using a first value and one or more second values. The first value is the count value acquired from the counting device, and the one or more second values are reference values that are stored in the memory and are used for determining a next maintenance time. The one or more index values are able to be used for determining the next maintenance time.

The mold is set in a molding machine or a processing machine, and is at least one of molds/dies for injection molding, extrusion molding, blow molding, compression molding, press molding, forging, casting, and stamping. In the case of an injection molding machine, the mold is composed of a plurality of molds (parts), and a state where the molds are in contact with each other and a state where the molds are in non-contact with each other are repeated each time molding is performed. That is, a series of operations, in which the molds in the contact state transition to the non-contact state and then return to the contact state, is regarded as one cycle to be repeated.

When the mold is a mold for injection molding, the mold includes a first mold and a second mold that are relatively moved to be opened and closed. A molding material such as a resin is injected into a space formed between the first mold and the second mold when the first mold and the second mold are closed, and thereafter, a molded product is taken out when the first mold and the second mold are opened. Injecting the molding material into the space is referred to as "shot". The molding material is injected when the first mold and the second mold transition from the open state to the closed state, and thereafter, a molded product is taken out when the molds transition to the open state. Therefore, the number of shots of the mold corresponds to the number of operation cycles each including transition from "open state" to "closed state" and return to "open state".

The index values are calculated by using the count value of the number of shots and are outputted, whereby an appropriate timing of the next maintenance can be easily determined.

(2) Preferably, the index values include the number of shots that can be performed until the next maintenance time. The index values being outputted make it possible to know how many shots remain until reaching the next maintenance, whereby an appropriate timing of the next maintenance can be easily determined.

(3) Preferably, the index values include the number of shots from the last maintenance time. The index values being outputted make it possible to know how many shots remain until reaching the next maintenance if the number of shots that can be performed from the last maintenance time to the next maintenance time is known, whereby an appropriate timing of the next maintenance can be easily determined.

The one or more second values include, for example, at least one of: the total number of shots at the last maintenance time, the total number of shots at the next maintenance time, and the number of shots that can be performed from the last maintenance to the next maintenance. Specifically, if the index values include the number of shots that can be performed until the next maintenance time, the total number of shots at the next maintenance time may be used as the second value, or the total number of shots at the least maintenance time and the number of shots that can be performed from the last maintenance to the next maintenance may be used as the second values. If the index values include the number of shots from the last maintenance time, the total number of shots at the last maintenance time is used as the second value. The "total number of shots" indicates the count value of the counting device at that time, in other words, a cumulative value of the number of shots counted from the start of counting.

(4) Preferably, the processor is configured to further execute an output process of outputting parameters, which are obtained from the count values in a first period and a second period, in a time-series manner in which starting points of the first period and the second period are made to coincide each other. The first period is a period from the last maintenance time. The second period is a period from a first maintenance time before the last maintenance time to a second maintenance time next to the first maintenance time. Each parameter obtained from the count value includes at least one of a count value and a cycle time. Outputting the parameters in a time-series manner indicates outputting them along the lapse of time, and includes arranging the parameters in the order of the count values from the maintenance time. This enables comparison of temporal changes in the parameters obtained from the count values, between the first period and the second period. Thus, an appropriate timing of the next maintenance can be easily determined by further using comparison with the temporal change in the index value in the past.

(5) Preferably, the processor is configured to further execute a determination process of determining the next maintenance time, based on the parameter obtained from the count value in the first period and on the parameter obtained from the count value in the second period. Determining the next maintenance time includes, for example, at least one of advancing a scheduled maintenance time, and delaying the scheduled maintenance time. Thus, the next maintenance can be performed at an appropriate timing.

(6) A calculation method included in the present embodiment is a calculation method for a management device capable of communicating with a counting device configured to obtain a count value of a number of shots of a mold. The calculation method includes calculating one or more index values by using a first value and one or more second values. The first value is the count value acquired from the counting device, and the one or more second values are reference values that are stored in a memory and are used for determining a next maintenance time. The one or more index values are able to be used for determining the next maintenance time. The index values being outputted make it possible to easily determine an appropriate timing for the next maintenance.

<2. Examples of Management Device and Calculation Method>

With reference to FIG. 1, a management system 100 according to the present embodiment includes a counting device 1. The counting device 1 is mounted to a mold 3, and counts the number of opening and closing cycles of the mold 3 during molding using the mold 3. As described later, the counting device 1 includes a display 11 that displays a display screen including a count value of the number of opening and closing cycles of the mold 3.

The management system 100 further includes a management device 8. The counting device 1 is communicable with the management device 8 via a communication network 7 such as the Internet. The counting device 1 transmits, to the management device 8, data D1 including the count value of the number of opening and closing cycles of the mold 3.

The management system 100 further includes a user terminal 9. The user terminal 9 includes a camera 92 as an imaging device, and causes the camera 92 to image the display screen displayed on the display 11 of the counting device 1, as described later. The user terminal 9 is communicable with the management device 8 via the communication network 7. The user terminal 9 transmits, to the management device 8, data D2 including image data obtained through the imaging.

The management system 100 may include other devices (not shown), and the management device 8 may be communicable with the other devices via the communication network 7. The other devices are, for example, personal computers, which are assumed to be installed in a site where molding is performed, installed in a department where molding is managed, and installed in other remote places. This enables management to be performed not only at the site where molding using the mold 3 is performed but also in the remote places.

Preferably, the mold 3 is provided with a display 311 of identification information, and the display 311 is also imaged by the camera 92 of the user terminal 9. In this case, image data of the display 311 is also included in the data D2. Instead of the image data, the identification information of the mold 3 may be included in the data D2. If the counting device 1 is associated with the mold 3 in advance, the mold 3 can be identified by identification information of the counting device 1 instead of the identification information of the mold 3.

The mold 3 is set in a molding machine 6 or a processing machine. The mold 3 is at least one of molds/dies for injection molding, extrusion molding, blow molding, compression molding, press molding, forging, casting, and stamping. A mold is composed of a pair of molds (parts), and a state where the paired molds are in contact with each other and a state where the paired molds are in non-contact with each other are repeated each time molding is performed. That is, a series of operations, in which the molds in the contact state transition to the non-contact state and then return to the contact state, is regarded as one cycle to be repeated.

In the following description, the mold 3 is a mold for injection molding. The mold 3 used for injection molding includes a first mold 4 and a second mold 5 that are relatively moved to be opened and closed. One of the first mold 4 and the second mold 5 is a mold that is relatively moved to be opened and closed while the other mold is a fixed mold. The fixed mold may not necessarily be a mold. As for the terms "first mold 4" and "second mold 5", the fixed mold is regarded as a mold for convenience sake.

The molding machine 6 for injection molding is configured as follows, for example. That is, a cavity (hollow part) is formed by the fixed mold (e.g., the first mold 4) and the movable mold (e.g., the second mold 5) of the mold 3, and the cavity is filled with a synthetic resin as a molding material that is melted in a cylinder or the like and ejected from a nozzle or the like, thereby producing molded products one by one. Specifically, a molding material such as a resin is injected into the space formed between the first mold 4 and the second mold 5 when the first mold 4 and the second mold 5 are closed, and thereafter, a molded product is taken out when the first mold 4 and the second mold 5 are opened. Injecting the molding material into the space is referred to as "shot".

The number of shots of the mold 3 indicates the number of times the molding material is injected into the space. In the injection molding, one opening and closing operation of the first mold 4 and the second mold 5 corresponds to one shot. That is, when the mold 3 is a mold for injection molding, the number of shots is the number of opening and closing cycles of the mold 3.

Figure 2:
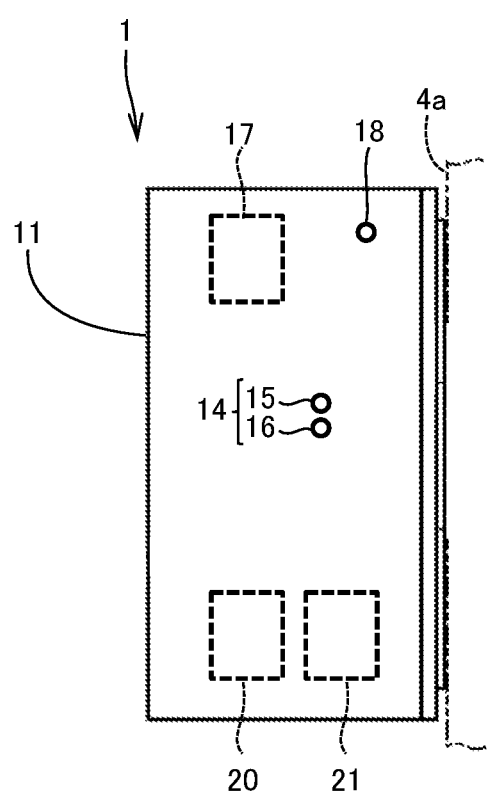
FIG. 2 is a schematic side view of a counting device included in the management system.

With reference to FIG. 2, the counting device 1 includes a detector 14 for counting the number of opening and closing cycles of the mold 3. As an example, the detector 14 counts the number of opening and closing cycles by optically detecting a change in distance. In this case, the detector 14 includes a light emitter 15 that emits laser light, and a light receiver 16 that receives laser light.

Figure 3:
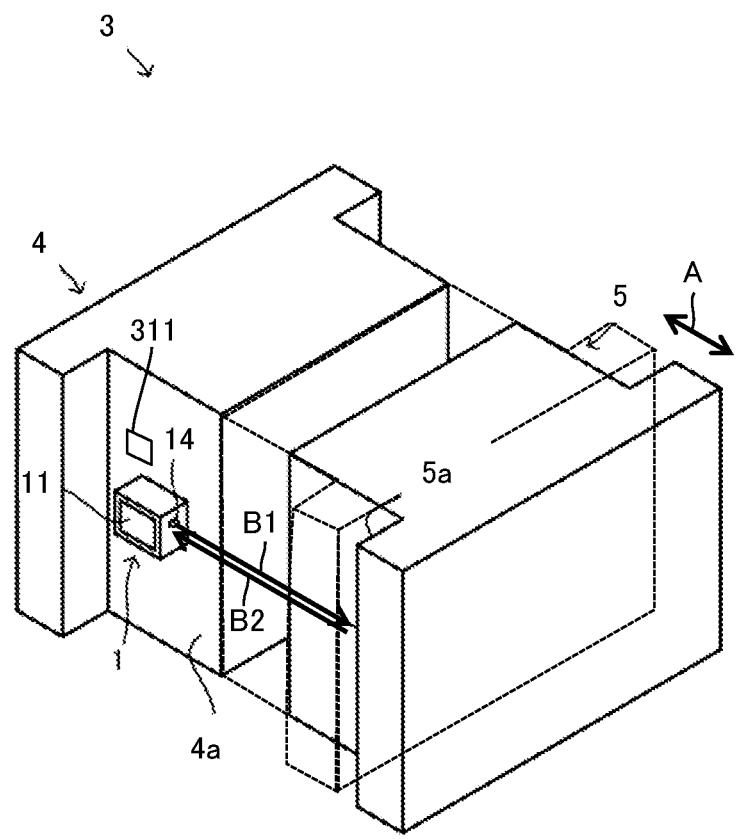
FIG. 3 is a schematic diagram showing an example of a state where the counting device is mounted to a mold.

With reference to FIG. 2 and FIG. 3, the counting device 1 is mounted to a side surface 4a of one mold (e.g., the first mold 4) of the mold 3 such that the detection direction of the detector 14 faces the other mold (second mold 5). Specifically, a target surface 5a is disposed on the second mold 5 or its vicinity. When the light emitter 15 emits laser light B1 toward the target surface 5a, the emitted laser light B1 is applied to the target surface 5a. The emitted laser light B1 is reflected at the target surface 5a, and the light receiver 16 receives reflected light B2 from the target surface 5a.

The target surface 5a is a surface whose distance with respect to the first mold 4 is changed when the first mold 4 and the second mold 5 are relatively moved to be opened and closed. As an example, as shown in FIG. 3, the target surface 5a is a surface, of the second mold 5, facing the first mold 4. The target surface 5a is not limited to the surface of the second mold 5 facing the first mold 4, and may be any surface of the mold 3 or a peripheral member to which the detector 14 faces, as long as the surface is within the detection range of the detector 14.

Preferably, the counting device 1 further includes a sensor 18. The sensor 18 is a sensor for detecting a measurement value obtained in relation to the mold 3, for example, an environmental value around the mold 3. For example, a sensor or the like for detecting a mold surface temperature and an ambient humidity corresponds to the sensor 18.

The counting device 1 further includes a processor 20 and a memory 21. Detection signals from the detector 14 and the sensor 18 are inputted to the processor 20. The counting device 1 includes a display 11 that displays a display screen according to control of the processor 20.

The memory 21 may be a primary storage device or a secondary storage device. The memory 21 stores therein a program to be executed by the processor 20.

The processor 20 reads out the program stored in the memory 21 and executes the program, thereby counting the number of opening and closing cycles of the mold 3 by using the detection signal from the detector 14, and storing the count value in the memory 21.

Moreover, the processor 20 measures a cycle time of the mold 3 by using the detection signal from the detector 14, and stores the cycle time in the memory 21. The cycle time is an interval of the opening and closing operation. Assuming that start of the opening and closing operation is a measurement timing, for example, the cycle time is a time period from start of a first opening and closing operation to start of a second opening and closing operation next to the first opening and closing operation. The processor 20 measures the cycle time each time it detects opening and closing.

The processor 20 reads out the program stored in the memory 21 and executes the program to cause the display 11 to display a display screen including count information. As an example, the display 11 is caused to display a display screen 110 shown in FIG. 4. The count information includes items indicated by indications 111 to 115 on the display screen 110.

Specifically, the display screen 110 includes: an indication 111 of the count value, i.e., the number of opening and closing cycles of the mold 3; an indication 112 of the cycle time; an indication 113 of the mold surface temperature; an indication 114 of the ambient humidity; and an indication 115 of date and time.

The count value indicated by the indication 111 is, for example, a total number of shots from when the counting device 1 starts to count opening and closing of the mold 3 in molding using the mold 3. The total number of shots indicates a cumulative value of the number of shots from the initial state of the counting device 1 (e.g., from when the counting device 1 is mounted to the mold). Here, it is assumed that the number of shots is not reset at each maintenance of the mold 3 but is continuously accumulated. In this case, the indication 111 indicates the latest count value, stored in the memory 21, which is caused to be displayed by the processor 20.

The indication 112 indicates the latest cycle time stored in the memory 21. The indications 113 and 114 respectively indicate the mold surface temperature and the ambient humidity that are read from a sensor signal obtained from the sensor 18. The indication 115 indicates the present date and time that is obtained according to a calendar function of the processor 20.

The counting device 1 further includes a communication device 17 that is communicable with the management device 8 via the communication network 7. Communication between the communication device 17 and the management device 8 may be performed wirelessly or by wire.

The processor 20 reads out the program stored in the memory 21 and executes the program to cause the communication device 17 to transmit data D1 including the count value to the management device 8. The data D1 further includes the cycle time, the mold surface temperature, the ambient humidity, the date and time, etc., in association with the count value. Preferably, the data D1 further includes identification information of the counting device 1.

The data D1 is transmitted at a predetermined timing. The predetermined timing is, for example, at least one of: a regular interval; a timing at which an operation unit (not shown) receives a user operation that instructs transmission; and each time an opening and closing operation is detected.

If the data D1 is transmitted each time an opening and closing operation of the mold 3 is detected, the data D1 includes the count value and the cycle time of the detected opening and closing operation of the mold 3, and the mold surface temperature and the like at the timing of the detection.

If the data D1 is transmitted for each predetermined period in which an opening and closing operation of the mold 3 is detected a plurality of number of times, the data D1 includes a combination of the count value, the cycle time, and the mold surface temperature and the like at the timing of the detection, for each of the plurality of opening and closing operations detected.

The transmission timing of the data D1 may be any of the above timings. Therefore, in the following description, a group of data including the count value and the cycle time regarding one opening and closing operation, and the mold surface temperature at the timing of the detection is also referred to as count data. In other words, the data D1 transmitted from the counting device 1 includes one or a plurality of count data.

The user terminal 9 is assumed to be a tablet, a smartphone, a personal computer, or the like, and includes a processor 90 and a memory 91. The memory 91 stores therein a program to be executed by the processor 90. This program is an application for managing the mold 3 by using the user terminal 9. The user terminal 9 further includes a communication device 93 that is communicable with the management device 8 via the communication network 7.

The user terminal 9 includes a camera 92 that performs imaging when the processor 90 controls the same according to a user operation. The camera 92 may perform imaging according to control of the processor 90. That is, the camera 92 may automatically perform imaging at a prescribed timing such as a regular interval even if there is no user operation. The processor 90, according to execution of the application, causes the communication device 93 to transmit data D2 including image data obtained through the imaging of the camera 92, to the management device 8 via the communication network 7.

Figure 5:
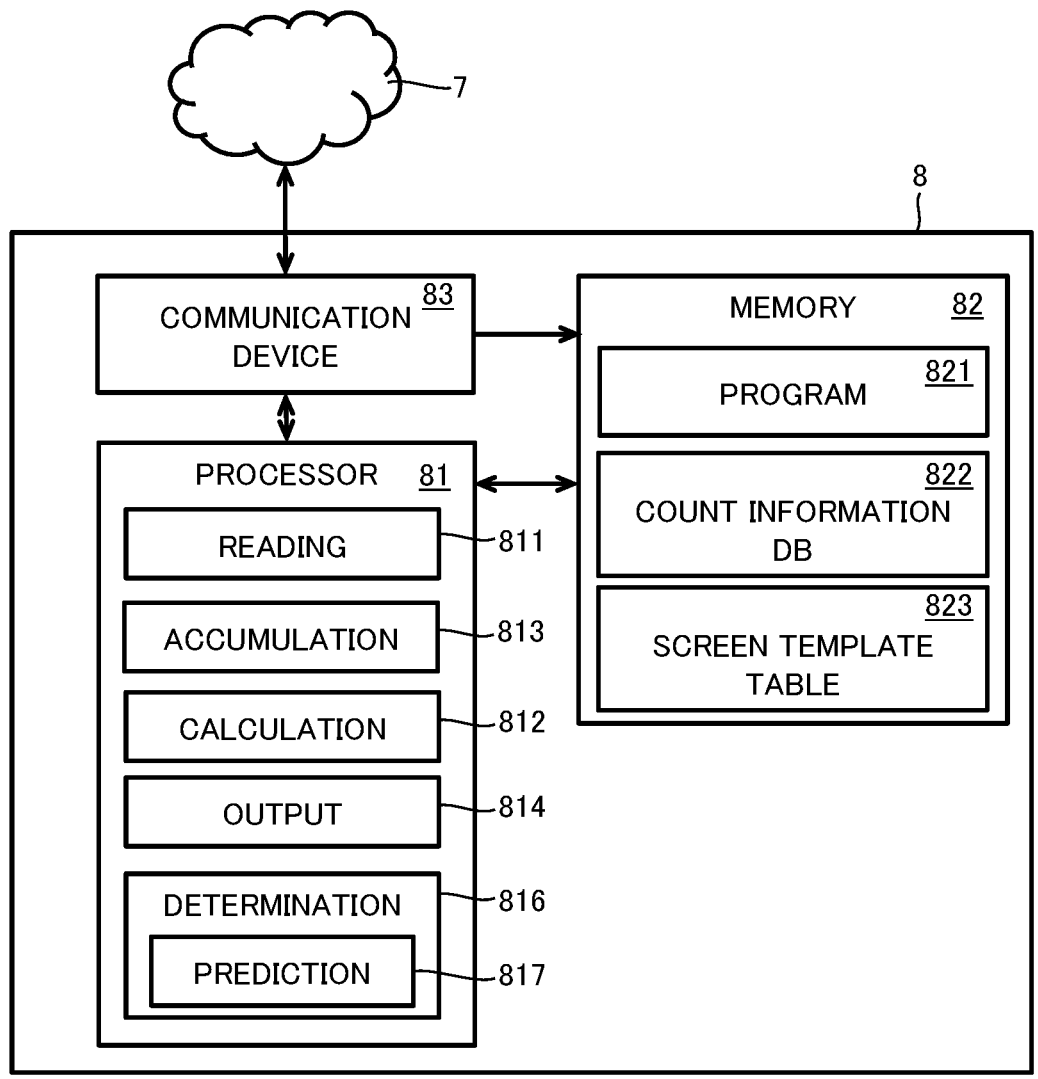
FIG. 5 is a schematic configuration diagram showing a management device included in the management system.

With reference to FIG. 5, the management device 8 is composed of one computer including a processor 81 and a memory 82. The management device 8 may be composed of a plurality of computers in cooperation with each other. The memory 82 may be either a primary storage device or a secondary storage device. The management device 8 further includes a communication device 83 that is communicable with the counting device 1 and the user terminal 9 via the communication network 7.

The memory 82 stores therein a program 821 to be executed by the processor 81. The processor 81 executes the program 821 to execute operation processing for a management operation.

The memory 82 further includes a count information DB (data base) 822 for storing count information therein. The count information is information including the count value of the counting device 1, and includes the count value to which other pieces of information are linked according to the result of an accumulation process 813 by the processor 81 described later.

The memory 82 further includes a screen template table 823 that defines screen templates. A screen template is information indicating a layout of a display screen of a device used for molding, such as the counting device 1 or peripheral equipment. Specifically, the screen template is information indicating what information is displayed at which position. The screen template table 823 defines a screen template for each device. Thus, information necessary for the processing in the processor 81 can be obtained from the display screen of the counting device 1 or peripheral equipment.

The operation processing executed by the processor 81 includes a reading process 811. The reading process 811 includes a process of performing character recognition on the image data included in the data D2 received by the communication device 83, and reading character information. An example of the character recognition is optical character recognition (OCR).

The operation processing executed by the processor 81 includes an accumulation process 813. The accumulation process 813 is a process of accumulating the count value of the counting device 1, which is obtained from the data D2 through the reading process 811, in the count information DB 822 by using the data D1 transmitted from the counting device 1.

The operation processing executed by the processor 81 includes a calculation process 812. The calculation process 812 is an example of a process using the data accumulated in the count information DB 822, and is a process of calculating an index value. The index value is a value capable of being used for determining a timing of next maintenance. In order to perform the calculation process 812, one or a plurality of reference values are stored in the memory 82.

The index value is, for example, the number of times of molding using the mold 3, i.e., the number of opening and closing cycles of the mold 3 (hereinafter, referred to as "number of remaining opening and closing cycles"), which can be performed until the next maintenance time. The number of remaining opening and closing cycles is also referred to as the number of remaining shots. In this case, an example of the reference value is the number of opening and closing cycles of the mold 3 (total number of shots) at the previous (last) maintenance time or the number of opening and closing cycles of the mold 3 that can be performed during a period from the last maintenance to the next maintenance (hereinafter referred to as "first reference number of cycles"; "first reference number of shots"). The first reference number of cycles is set in advance, for example. The first reference number of cycles can be set and changed by the user. The first reference number of cycles is set to a value of about 5000, for example. The number of opening and closing cycles (total number of shots) of the mold 3 at the previous maintenance time is stored as the count value in the count information DB 822. The first reference number of cycles is stored as the reference value in the memory 82.

The processor 81, in the calculation process 812, reads out the count value at the previous maintenance of the mold 3 (the total number of shots at the previous maintenance time) from the count information DB 822. Then, the processor 81 subtracts the read count value from the count value included in the count data in the data D1, i.e., the latest count value (latest total number of shots). A resultant value is the number of opening and closing cycles of the mold 3 from the previous maintenance time.

Moreover, the processor 81 reads out the first reference number of cycles from the memory 82, and subtracts, from the first reference number of cycles, the number of opening and closing cycles from the previous maintenance time, thereby obtaining the number of remaining opening and closing cycles (number of remaining shots) as an index value. The index value being displayed allows the user to know the number of remaining opening and closing cycles of the mold 3 that can be performed until the next maintenance.

The number of remaining opening and closing cycles may be calculated by another calculation method. For example, as a reference value, the number of opening and closing cycles of the mold 3 at the next maintenance time (hereinafter referred to as "second reference number of cycles"; "second reference number of shots") may be used. The second reference number of cycles is stored as a reference value in the memory 82.

The processor 81 reads out the second reference number of cycles from the memory 82, and subtracts, from the second reference number of cycles, the count value included in the count data in the data D1, i.e., the latest count value (latest number of shots), thereby obtaining an index value. The index value thus obtained allows the user to know the number of remaining opening and closing cycles of the mold 3 until the next maintenance.

As another example, the index value may be the number of opening and closing cycles from the previous maintenance time. In this case, the reference value is the number of opening and closing cycles of the mold 3 at the previous maintenance time. The processor 81 reads out, from the count information DB 822, the count value at the previous maintenance of the mold 3, and subtracts the count value from the count value included in the count data in the data D1, i.e., the latest count value (total number of shots), thereby obtaining an index value. The index value thus obtained allows the user to know the number of remaining opening and closing cycles if he/she knows the first reference number of cycles in advance. The first reference number of cycles may be displayed on the screen.

The operation processing executed by the processor 81 includes an output process 814. The output process 814 is an example of the process using the data accumulated in the count information DB 822, and includes a process of outputting a display screen based on the count value so as to be displayed on another device such as the user terminal 9. When the management device 8 includes a display, the output process 814 may include displaying the display screen on the display. This allows the user to see the display screen based on the count value even when he/she is in a place remote from the site of molding using the mold 3, thereby realizing remote management.

Preferably, the output process 814 includes a process of calculating a cycle time average value. The cycle time average value is obtained by dividing the total time measured during a plurality of opening and closing operations of the mold 3, by the number of opening and closing cycles. In the output process 814, the cycle time average time may be outputted.

Preferably, the operation processing executed by the processor 81 includes a determination process 816. The determination process 816 is an example of the process using the data stored in the count information DB 822, and is a process of determining whether or not the first reference number of cycles or the second reference number of cycles (referred to simply and representatively as "reference number of cycles") stored in the memory 82 is appropriate. Determining that the reference number of cycles is not appropriate may be either determining that the reference number of cycles is too great or determining that the reference number of cycles is too small. That is, the determination may include at least one of determining that the scheduled next maintenance is too early, and determining that the scheduled next maintenance is too late. Moreover, the determination process 816 may include a prediction process 817 of predicting an appropriate reference number of cycles, i.e., an appropriate timing of the next maintenance, if the reference number of cycles is determined to be inappropriate.

A description will be given of a method of managing the mold 3 in the management system 100. With reference to FIG. 1, the counting device 1 mounted to the mold 3 set in the molding machine 6 counts the number of opening and closing cycles of the mold 3. Preferably, each time the counting device 1 detects opening and closing of the mold 3, the counting device 1 counts the same and also detects a measurement value such as the mold surface temperature. Then, the counting device 1 updates the display screen of the display 11. An example of the display screen of the display 11 of the counting device 1 is the display screen 110 shown in FIG. 4.

The counting device 1 transmits the data D1 including one or a plurality of count data, each having been obtained at a timing when one opening and closing operation is detected, to the management device 8 at a predetermined timing (step S1).

The user terminal 9 is, for example, carried by the user of the molding machine 6. When the user manages the mold 3 by using the user terminal 9, the user starts an application for managing the mold 3.

Figure 6:
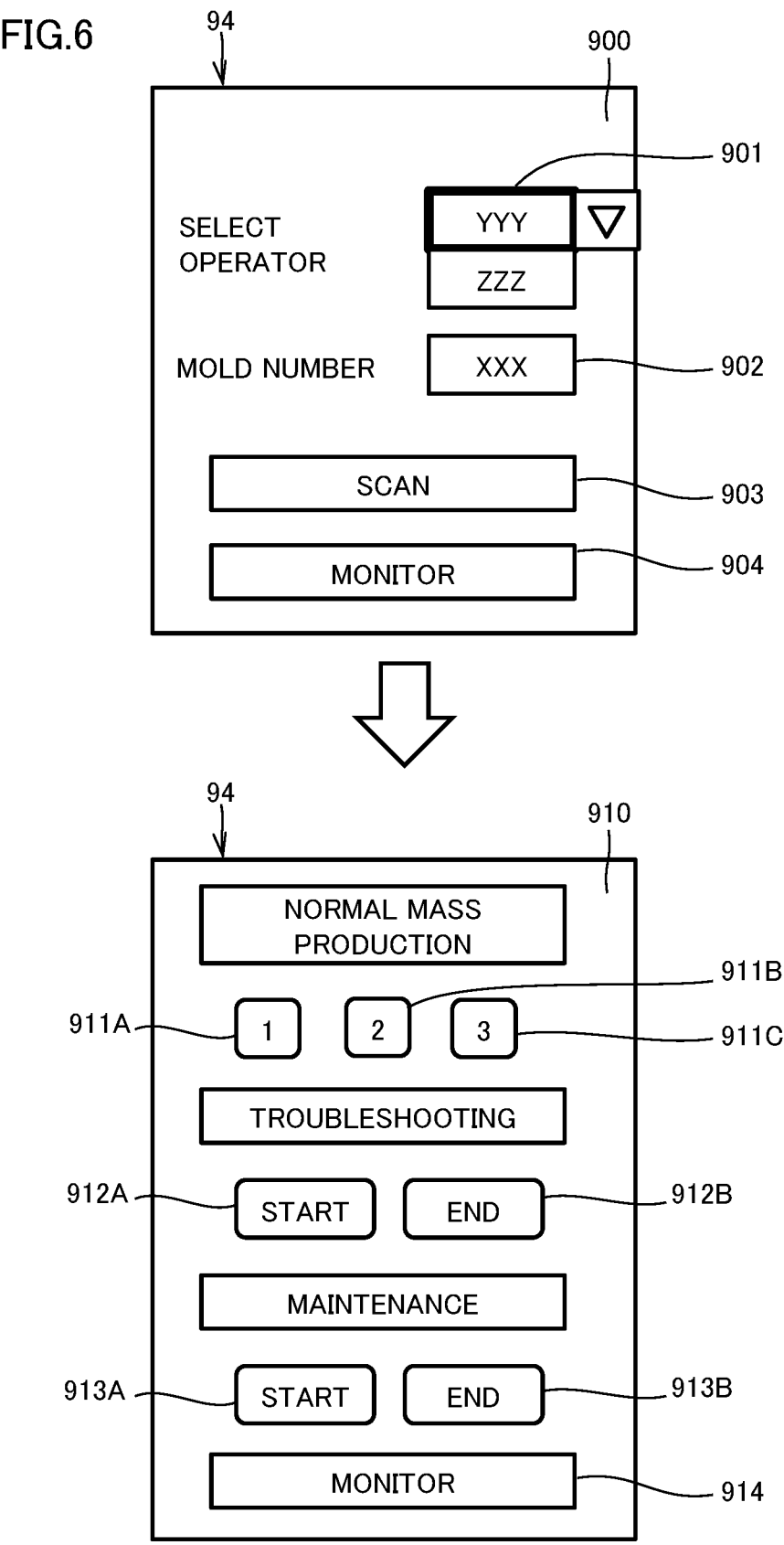
FIG. 6 is a schematic diagram showing an example of transition of a display screen of a user terminal included in the management system.

An input screen 900 shown in FIG. 6 is an example of a screen, for inputting information, which is displayed on a display 94 when the application is started. The input screen 900 includes, as user information, an input box 901 for identification information of an operator of the molding machine 6, an input box 902 for identification information of the mold 3 to be managed, and a button 903 for instructing imaging by a camera 92. The input screen 900 may further include a button 904 for instructing display of a screen including a count result described later.

When the application is started, a login screen (not shown) may be displayed on the display 94. In this case, input of the user information can be received on the login screen.

The identification information of the mold 3 may be obtained by imaging the display 311 disposed on the mold 3 at the time of imaging described later, instead of being inputted to the input box 902.

The user information may include information that specifies the type of the user. A plurality of types of users such as an operator, an administrator, and a chief administrator are conceivable as the users in molding using the mold 3. On the input screen 900, input of at least one of identification information of the user and identification information of the type of the user, is received.

The application may vary the operation authority according to the type of the user. For example, if the inputted type of the user is an operator, the application may hide or highlight the button 904 so that the user cannot perform an instruction to display the screen including the count result. Thus, the management authority can be set according to the type of the user, thereby realizing flexible management.

While molding using the mold 3 is performed, the user operates the button 903 on the input screen 900 of the user terminal 9 so that the display 11 of the counting device 1 is within the imaging range of the camera 92. Thus, the camera 92 images the display screen on the display 11 of the counting device 1 (step S2).

When image data is obtained through the imaging by the camera 92, the input screen 900 displayed on the display 94 is switched to a display screen 910, according to execution of the application. The display screen 910 is an example of an input screen for inputting an event at the time of opening and closing of the mold 3 displayed on the display screen included in the image data.

The event is an event that occurs during a work process using a mold. Examples of the work process using a mold include molding using a mold, processing using a mold, and any other work using molds. Examples of the event that occurs in molding using a mold include: an event that occurs in producing molded products through a normal process using the mold 3 (hereinafter referred to as "normal mass production"); an event that occurs during maintenance; and an event that occurs during troubleshooting.

Examples of events that sequentially occur during the normal mass production include: start of a preparation process (hereinafter referred to as "dummy shot") such as a dummy shot or a trial shot to be performed before start of the normal mass production ("1" in FIG. 6); start of the normal mass production ("2" in FIG. 6); and end of the normal mass production ("3" in FIG. 6). The display screen 910 includes buttons 911A, 911B, and 911C respectively representing the above events.

As for the events during maintenance and troubleshooting, start and end of each event occur in this order. The display screen 910 includes: buttons 912A, 912B respectively representing start and end of troubleshooting, and buttons 913A, 913B respectively indicating start and end of maintenance. The display screen 910 may also include buttons representing other events. Like the input screen 900, the display screen 910 may also include a button 914 for instructing display of the screen including the count result.

The display screen 910 receives a user operation to any of the buttons 911A to 913B. This user operation designates an event, at the time of opening and closing of the mold 3, which is displayed on the display screen included in the image data obtained through imaging by the camera 92.

Upon receiving the user operation designating the event, the user terminal 9, according to execution of the application, transmits the data D2 including the image data obtained in step S2 and a signal indicating the user operation performed on the display screen 910, to the management device 8 (step S3).

Figure 7:
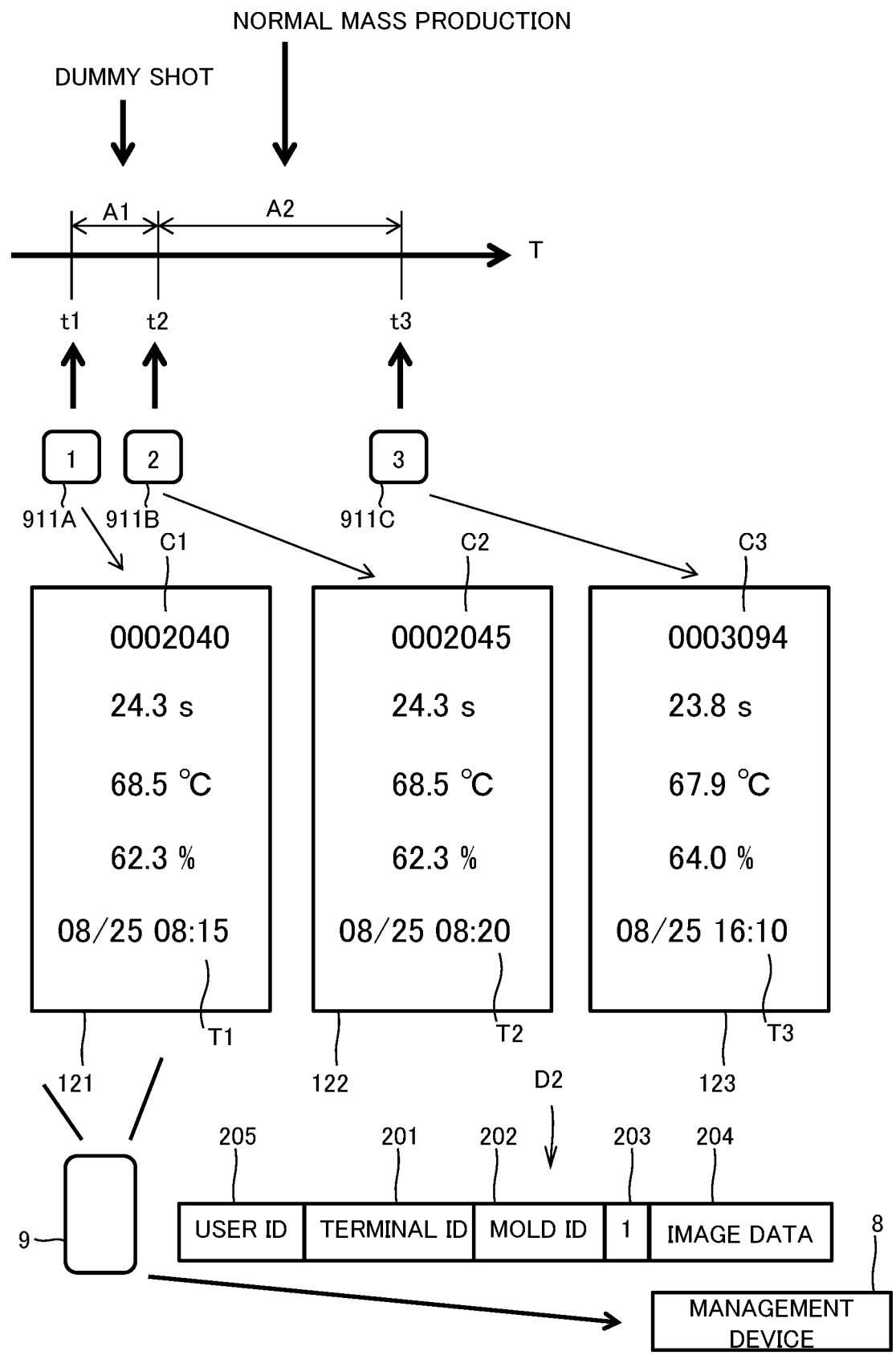
FIG. 7 is a schematic diagram illustrating a flow of an operation of imaging the display screen of the counting device by using the user terminal, and transmitting image data to the management device.

Specifically, with reference to FIG. 7, in a case where normal mass production of molded products is performed by the molding machine 6 using the mold 3, after power-on of the molding machine 6, dummy shots are performed during a period A1 from time t1 to time t2, and the normal mass production is performed during a period A2 from time t2 to time t3.

In this case, after power-on of the molding machine 6, the user shoots a screen 121 displayed on the counting device 1 at time t1 by using the user terminal 9, and thereafter designates an event by operating the button 911A on the screen 910. Thus, the data D2 is transmitted to the management device 8 in step S3.

Next, at time t2 when the normal mass production is started, the user shoots a screen 122 displayed on the counting device 1 by using the user terminal 9, and thereafter designates an event by operating the button 911B on the screen 910. Thus, the data D2 is transmitted to the management device 8 in step S3.

Next, at time t3 when the normal mass production is ended, the user shoots a screen 123 displayed on the counting device 1 by using the user terminal 9, and thereafter designates an event by operating the button 911C on the screen 910. Thus, the data D2 is transmitted to the management device 8 in step S3.

As shown in FIG. 7, the data D2 includes data 201 indicating the identification information of the user terminal 9, data 202 indicating the identification information of the mold 3, data 203 indicating the event, and image data 204. The data D2 further includes data 205 indicating the identification information of the user inputted on the input screen 900.

Upon acquiring the data D2 including the data 203 indicating the event designated by the button 911A, the processor 81 of the management device 8 acquires a count value C1 (2040) from the image data 204, of the screen 121 at time t1, included in the data D2. The processor 81 further acquires time T1 (8:15).

Upon acquiring the data D2 including the data 203 indicating the event designated by the button 911B, the processor 81 of the management device 8 acquires a count value C2 (2045) from the image data 204, of the screen 122 at time t2, included in the data D2. The processor 81 further acquires time T2 (8:20).

Upon acquiring the data D2 including the data 203 indicating the event designated by the button 911C, the processor 81 of the management device 8 acquires a count value C3 (3094) from the image data 204, of the screen 123 at time t3, included in the data D2. The processor 81 further acquires time T3 (16:10).

Upon acquiring the data D2, the processor 81 of the management device 8 acquires the count value C1 and the time T1 from the image data of the screen 121, acquires the count value C2 and the time T2 from the image data of the screen 122, and acquires the count value C3 and the time T3 from the image data of the screen 123. The processor 81 calculates a net number of products PN, a net time of production PT, and an average cycle time AT according to the following equations (1) to (3), respectively. The net number of products indicates the number of shots during a period from start to end of the normal mass production, and the net time of production indicates the length of the period from start to end of the normal mass production.

$$PN1 = C3 - C2 = 3094 - 2045 = 1049 \quad (1)$$

$$PT1 = T3 - T2 = (16{:}10) - (8{:}20) = 7 \text{ h } 50 \text{ m} \quad (2)$$

$$AT = (T3 - T2)/(C3 - C2) = 7 \text{ h } 50 \text{ m}/1049 = 26.88 \text{ s} \quad (3)$$

The same applies to the case where the event is troubleshooting. That is, the user shoots a screen displayed on the counting device 1 when troubleshooting is started, and thereafter designates the event by operating the button 912A on the screen 910. Thus, the data D2 is transmitted to the management device 8 in step S3.

Next, the user shoots a screen displayed on the counting device 1 when the troubleshooting is ended, and thereafter designates the event by operating the button 912B on the screen 910. Thus, the data D2 is transmitted to the management device 8 in the step S3.

Upon acquiring the data D2 including the data 203 indicating the event designated by the button 912A, the processor 81 of the management device 8 acquires a count value C4 (e.g., 4045) from the image data 204 included in the data D2. The processor 81 further acquires time T4 (e.g., 14:35).

Upon acquiring the data D2 including the data 203 indicating the event designated by the button 912B, the processor 81 of the management device 8 acquires a count value C5 (e.g., 4064) from the image data 204 included in the data D2. The processor 81 further acquires time T5 (e.g., 14:52).

The processor 81 calculates a net stop time PN2 and a troubleshooting time PT2 according to the following equations (4) and (5), respectively. The net stop time indicates the number of shots during a period from start to end of the troubleshooting.

$$PN2=C5-C4=4064-4045=19 \quad (4)$$

$$PT2=T5-T4=(14:52)-(14:35)=17 \text{ m} \quad (5)$$

The same applies to the case where the event is maintenance. That is, the user shoots a screen displayed on the counting device 1 when maintenance is started, and thereafter designates an event by operating the button 913A on the screen 910. Thus, the data D2 is transmitted to the management device 8 in step S3.

Next, the user shoots a screen displayed on the counting device 1 when the maintenance is ended, and thereafter designates an event by operating the button 913B on the screen 910. Thus, the data D2 is transmitted to the management device 8 in step S3.

Upon acquiring the data D2 including the data 203 indicating the event designated by the button 913A, the processor 81 of the management device 8 acquires a count value C6 (e.g., 5090) from the image data 204 included in the data D2. The processor 81 further acquires time T6 (e.g., 09/02 09:30).

Upon receiving the data D2 including the data 203 indicating the event designated by the button 913B, the processor 81 of the management device 8 acquires a count value C7 (e.g., 5090) from the image data 204 included in the data D2. The processor 81 further acquires time T7 (e.g., 09/05 11:45).

Since the counting device 1 does not perform counting during the maintenance, indication of the count value may not necessarily be included in the display screen. If the data 203 is data indicating the event designated by the button 913A or the button 913B, the processor 81 may not necessarily read the count value.

The processor 81 calculates a maintenance time PT3 according to the following equation (6).

$$PT3=T7-T6=(09/05 \ 11:45)-(09/02 \ 09:30)=3 \text{ d } 2 \text{ h } 15 \text{ m} \quad (6)$$

Upon acquiring the data D1 and the data D2, the management device 8 temporarily stores these data in the memory 82. In addition, the values obtained from the data D1 through the above equations (1) to (6) are also stored in the memory 82 as values for display. Then, the management device 8 performs a management operation by using these data (step S4). The management operation in step S4 includes the reading process 811 regarding the image data 204 included in the data D2.

Figure 4:
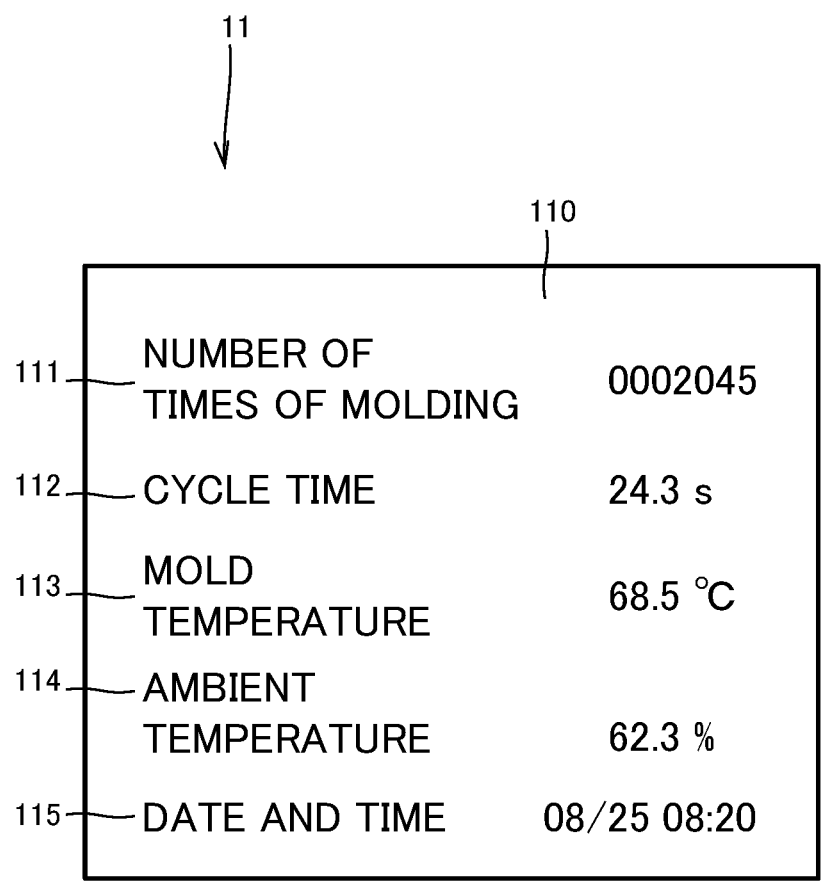
FIG. 4 shows an example of a display screen of the counting device.

If the display screen displayed based on the image data 204 is the display screen 110 shown in FIG. 4, the processor 81, in the reading process 811, acquires text indicating the count value from the position of the indication 111, text indicating the cycle time from the position of the indication 112, text indicating the mold surface temperature from the position of the indication 113, text indicating the ambient humidity from the position of the indication 114, and text indicating the date and time from the position of the indication 115. The texts thus acquired are temporarily stored in the memory 82 as read data.

Preferably, if the data D2 includes the identification information of the counting device 1, the processor 81, in the reading process 811, selects a screen template according to the counting device 1 from the screen template table 823, and acquires text acquired from a position designated in the screen template, as information associated with the position in the screen template. Thus, even when there are a plurality of types of counting devices, the management device 8 can acquire necessary information as text data from the data D2.

Figure 8:
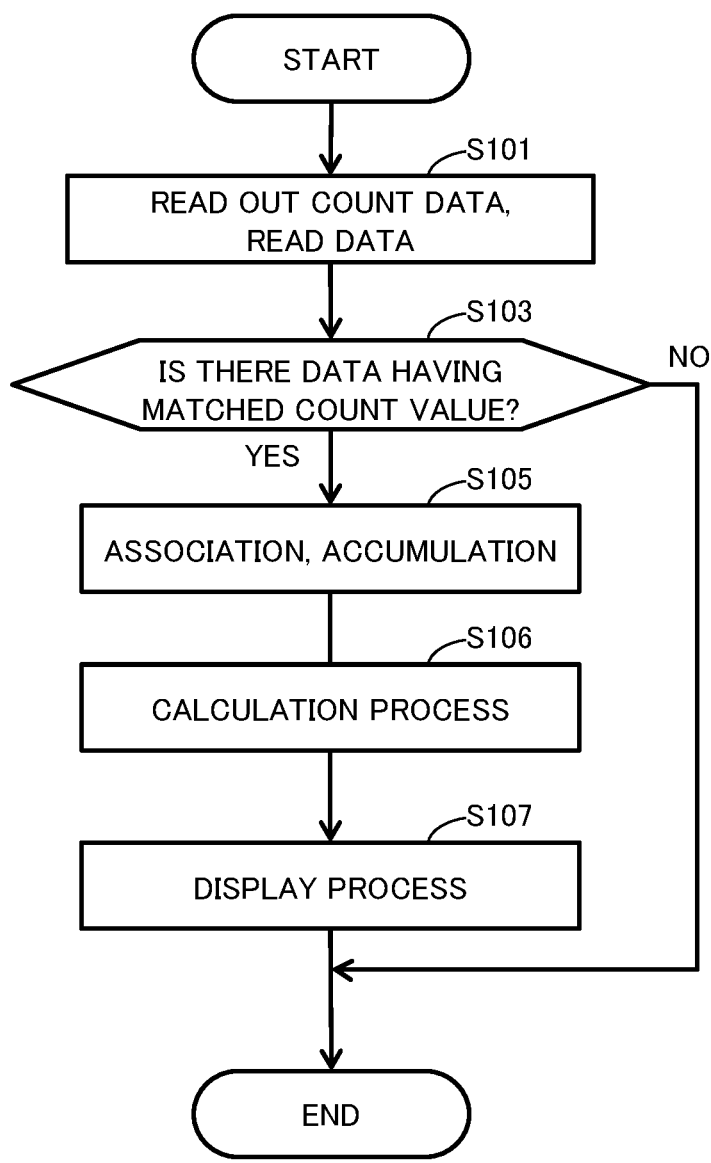
FIG. 8 is a flowchart showing an example of a flow of processing in the management device.

In step S4, the processor 81 of the management device 8 executes processing shown in a flowchart of FIG. 8. With reference to FIG. 8, in starting the processing, the processor 81 reads out the count data and the read data from the memory 82 (step S101).

The processor 81 associates the read count data and read data with each other, and stores the associated data in the count information DB 822 (steps S103, S105). The "associating" includes linking the data indicating the event designated in the data D2 to the corresponding count data. An example of the "linking" is "adding".

Specifically, the processor 81 extracts, from the read count data, count data whose count value matches the count value included in the data D2 (YES in step S103). The count value is an example of information that secures synchronization of data. In another example, time information may be used. Using the count value makes synchronization between the counting device 1 and the user terminal 9 unnecessary, and therefore facilitates the processing.

Figure 9:
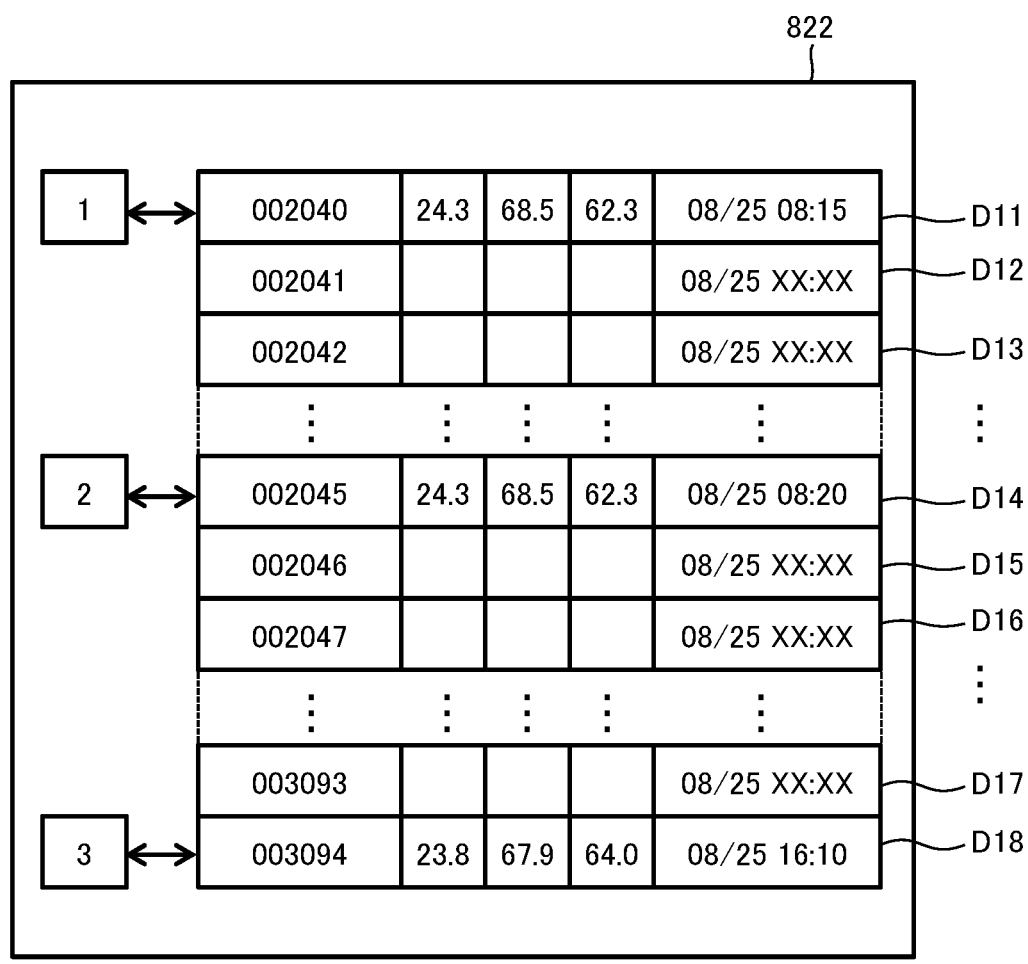
FIG. 9 is a schematic diagram illustrating an operation of storing data from the counting device and data from the user terminal in association with each other, in the management device.

With reference to FIG. 9, it is assumed that count data D11 to D18 are read out from the memory 82. A description will be given for a case where the count data D11 to D18 are associated with the read data from the data D2 obtained at time t1, time t2, and time t3 in FIG. 7 and are stored in the count information DB 822.

In this case, using the count values C1, C2, and C3 of the respective read data, the count data D11, D14, and D18, among the count data D11 to D18, whose count values match the count values C1, C2, and C3, respectively, are extracted. Then, data indicating the events included in the respective read data are added to the count data D11, D14, and D18 (FIG. 9).

As described above, since the count data and the events are linked to each other, it is possible to determine an event that occurs in the work process using the mold when the count data is obtained.

The "associating" is at least one of: linking the event to the count data; and linking the identification information of the mold 3 to the count data. The identification information of the mold 3 linked to the count data facilitates management of each of a plurality of molds 3.

Meanwhile, the "associating" may also be linking the identification information of the user to the count data. This facilitates management of each user. For example, management of each user includes at least one of: grasping start and end of work of each operator; and grasping work hours. Moreover, management of each user may also include calculating productivity for each combination of an operator and molding using the mold 3. This enables the data to be used for production planning, staffing schedule, evaluation, and the like.

The processor 81 executes a calculation process of calculating an index value, as an example of a process using the data accumulated in the count information DB 822 (step S106). In step S106, for example, the number of remaining opening and closing cycles is calculated by using: the count value, at the previous maintenance time, stored in the count information DB 822; the latest count value; and the reference number of cycles.

The processor 81 executes a display process of displaying a screen including the content result, as an example of the process using the data accumulated in the count information DB 822 (step S107). As an example, step S107 may be performed by operating the button 904 or 914 on the input screen 900 of the user terminal 9 or the display screen 910 for designating events.

A display used in step S107 is the display 94 of the user terminal 9 or another display device (not shown). This allows confirmation of the state of molding using the mold 3 even from a place remote from the site of the molding. If the display is performed in real time in step S107, confirmation can be remotely performed in real time. Moreover, the remote display allows molding operations at a plurality of sites to be intensively managed.

Figure 10:
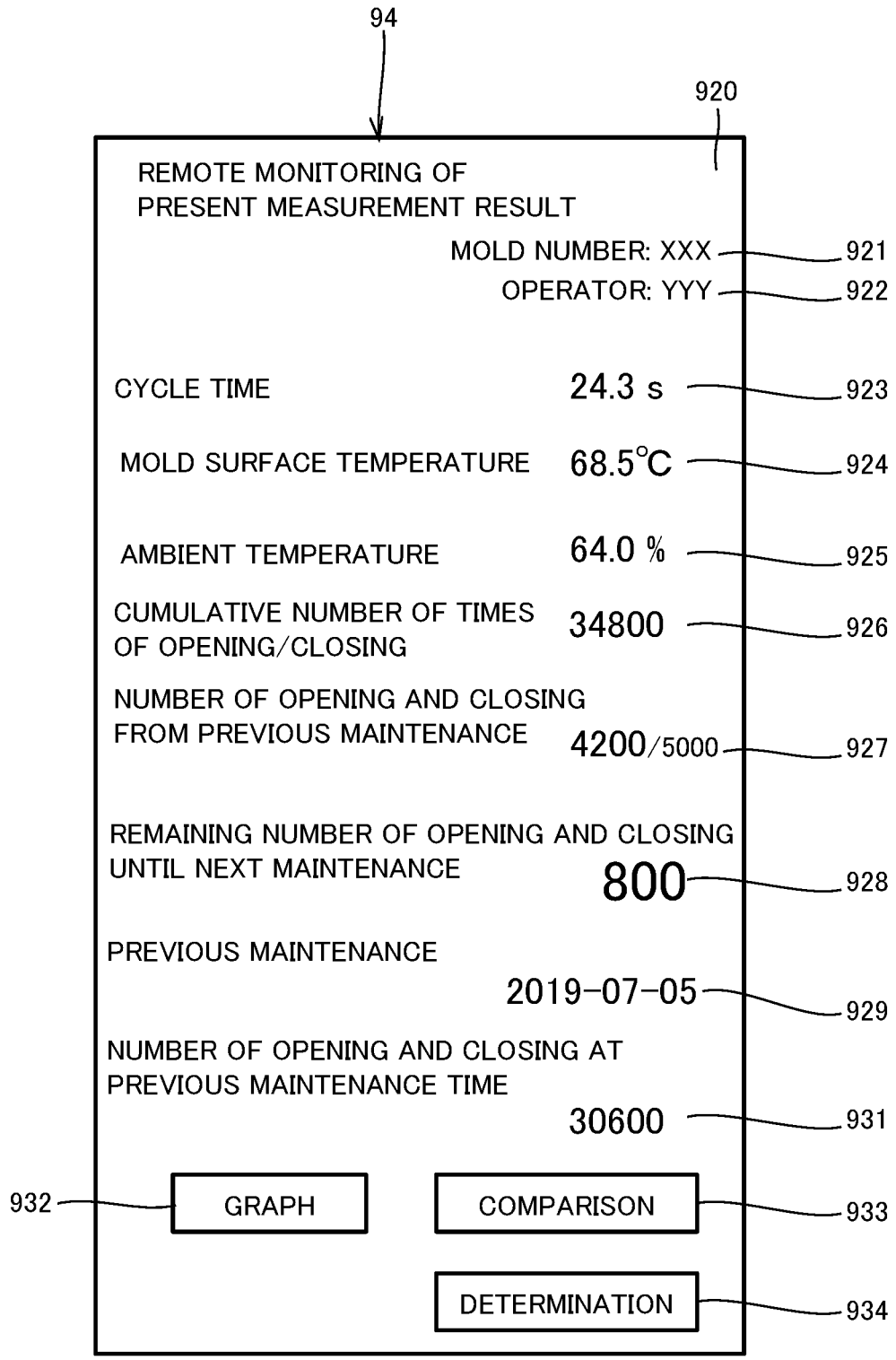
FIG. 10 is a schematic diagram showing an example of a display screen displayed on the user terminal by the management device.

In step S107, the processor 81 reads out the latest count data from the count information DB 822, and causes the display 94 of the user terminal 9 to display a display screen 920 shown in FIG. 10 by using the count data. Specifically, with reference to FIG. 10, the display screen 920 includes, as indications of information obtained from the count data, an indication 923 of a cycle time, an indication 924 of a mold surface temperature, an indication 925 of an ambient humidity, and an indication 926 of a cumulative number of opening and closing cycles of the mold 3, which is counted by the counting device 1.

The display screen 920 includes, as indications used by associating the count data with the data D2, an indication 921 of identification information of a mold to be managed, and an indication 922 of identification information of a user. These indications being displayed together with the count value allow the mold 3 being managed to be easily grasped, and moreover, allow an operator performing molding to be easily grasped.

The display screen 920 includes, as indications using the count data associated with the data D2, an indication 927 of the number of opening and closing cycles from the previous maintenance, an indication 928 of the number of remaining opening and closing cycles, an indication 929 of the time of the previous maintenance, and an indication 931 of the number of opening and closing cycles at the previous maintenance time. In the example of FIG. 10, "4200" included in the indication 927 indicates the number of opening and closing cycles from the previous maintenance, and "5000" indicates the first reference number of cycles. These indications allows an appropriate timing for the next maintenance to be easily determined.

In the example of FIG. 10, "4200" included in the indication 927 and "800" included in the indication 928 are index values X1 and X2 that are calculated when the processor 81 executes the calculation process 812.

A specific method for calculating the index value X1 is as follows. That is, a value V1 as follows is read out from the count information DB 822. A reference value V2A as follows, which is stored in the memory 82, is read out.
  total number of shots V1 at present=34800
  total number of shots V2A at the previous maintenance time=30600
The index value X1 is calculated by the following equation using the values V1 and V2A.

index value $X1=V1-V2A=34800-30600=4200$

A specific method for calculating the index value X2 is as follows. That is, the processor 81, after calculation of the index value X1, further reads out a reference value V2C as follows that is stored in the memory 82.
  the possible number of shots (first reference number of shots) V2C from the last maintenance to the next maintenance=5000
The index value X2 is calculated by the following equation using the reference value V2C and the index value X1.

index value $X2=V2C-(V1-V2A)=V2C-X1=5000-4200=800$

Another specific example of the method for calculating the index value X2 is as follows. That is, the processor 81 reads out a value V1 as follows, from the count information DB 822. Then, the processor 81 reads out a reference value V2B as follows that is stored in the memory 82.
  total number of shots V1 at present=34800
  total number of shots (second reference number of shots) V2B at the next maintenance time=35600
The index value X2 is calculated by the following equation using these values V1 and V2B.

index value $X2=V2B-V1=35600-34800=800$

The value of the cycle time for the indication 923 is at least one of: a value, measured for each opening and closing operation of the mold 3, which is included in the count data; and a value of an average cycle time calculated by the management device 8.

The display 923 may be an indication for abnormality report if the situation is at least one of: a case where a divergence between the value of the average cycle time and the value measured for each opening and closing operation of the mold 3 is greater than or equal to a threshold; and a case where a predetermined number of data, each being greater than or equal to a threshold, are consecutive. Instead of or in addition to the indication for abnormality report, a message may be transmitted to a specific user terminal. Thus, abnormality and variation in the cycle time are reported.

The display screen 920 further includes a button 932 for instructing a graph display. In step S107, when the button 932 is operated, the processor 81 may perform a graph display like a display screen 940 shown in FIG. 11. The display screen 940 includes an indication 941 that indicates, in a time-series manner, a parameter obtained from the count value accumulated in the count information DB 822. The parameter obtained from the count value includes at least one of the count value and the cycle time.

Figure 11:
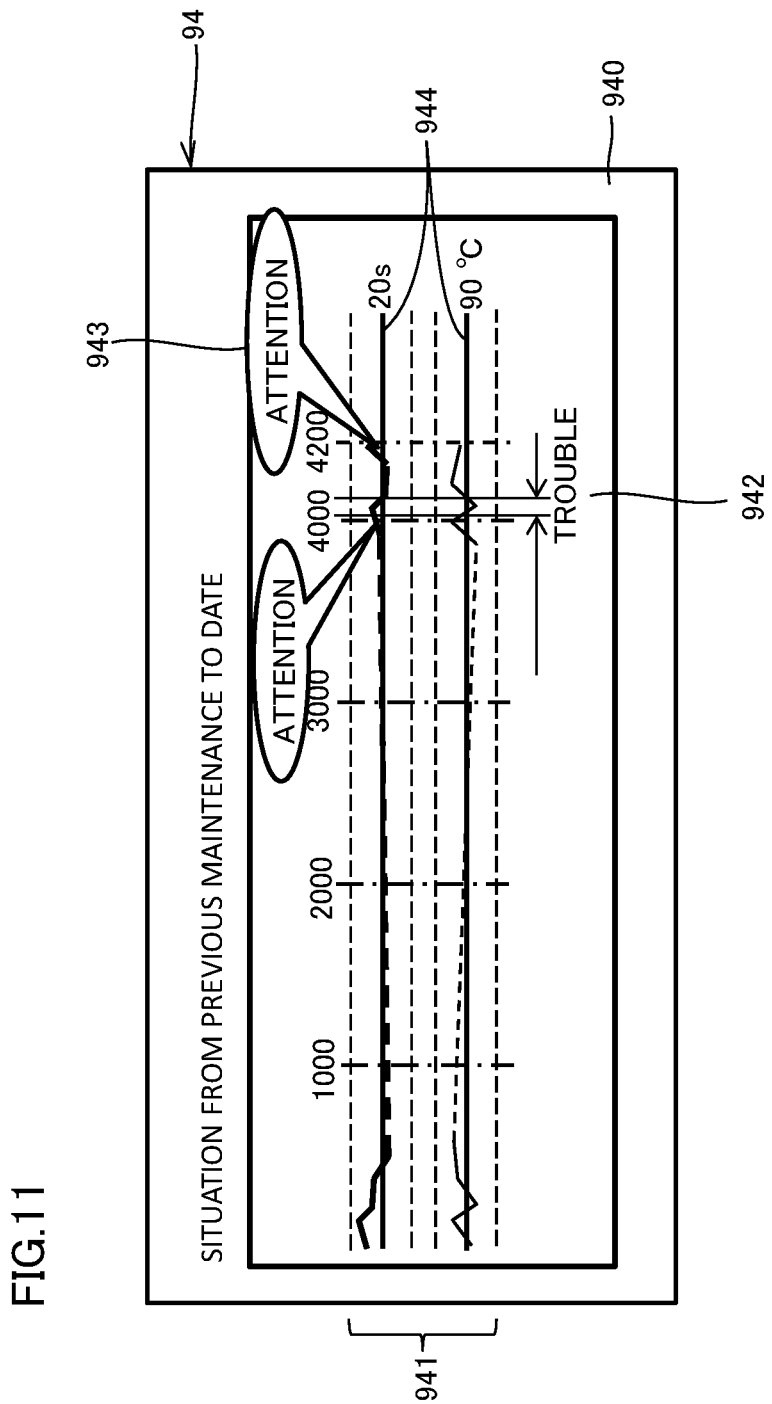
FIG. 11 is a schematic diagram showing an example of a display screen displayed on the user terminal by the management device.

Specifically, the processor 81 reads out, from the count information DB 822, count data from the count data at the previous maintenance time to the latest count data, and displays the cycle time in a time-series manner. The cycle time is an example of the parameter obtained from the count value. Instead of the cycle time, the count value may be used. The indication 941 shown in FIG. 11 indicates, in a time-series manner, the cycle time and the mold surface temperature from the previous maintenance time. The "time-series manner" means displaying the cycle time and the mold surface temperature along the lapse of time, and as shown in FIG. 11, they are arranged according to the order of the count values from the maintenance time. Thus, a temporal change in the cycle time from the counting device 1 can be seen at a glance. With the temporal change in the cycle time, a temporal change in the mold surface temperature can also be seen at a glance.

Preferably, the indication 941 includes an indication 944 of a boundary value between abnormal and normal of at least the cycle time. The boundary value is, for example, a management reference value, a value defined according to a rule, or the like. The boundary value may be a fixed value (e.g., 20s) as shown in FIG. 11, or may be a value that varies with the lapse of time from the previous maintenance. Thus, the cycle time compared with the boundary value can be grasped at a glance. Therefore, it is possible to grasp, even remotely, signs of abnormality in a facility for molding and abnormality in quality of molded products.

More preferably, when the divergence of the cycle time from the boundary value is greater than or equal to a threshold, the processor 81 performs an indication 943 of this situation. Instead of or in addition to the indication 943, a message may be transmitted to a specific user terminal. Thus, occurrence of abnormality can be easily grasped, thereby realizing quick countermeasure. Moreover, the indication 943 is useful in determining a timing of next maintenance.

Preferably, the processor 81 determines whether or not the indication 943 is necessary, based on the content of the event. As an example, in a preset period such as a period immediately after a maintenance or a period for dummy shots, the processor 81 determines not to perform the indication 943 even when the divergence of the value included in the count data from the boundary value is greater than or equal to the threshold. Thus, the indication 943 can be flexibly performed according to the practical use.

Preferably, the indication 941 includes an indication 942 indicating an event associated with the count data. On the display screen 940, the indication 941 includes the indication 942 indicating a trouble period between start of a trouble and end of the trouble. In addition, an indication indicating a period of normal mass production may be included. This allows the event as well as the data included in the count data to be grasped at a glance.

The display screen 920 further includes a button 933 for instructing comparative display. In step S107, when the button 933 is operated, the processor 81 may perform a graph display as shown in a display screen 950 in FIG. 12. The display screen 950 is a screen on which a plurality of count data accumulated in the count information DB 822 are displayed in a comparable manner for each predetermined period with a specific event being a reference timing.

Specifically, assuming that the reference timing is the last maintenance time, the display screen 950 includes an indication of a change in data from the last maintenance time. That is, the display screen 950 includes an indication 951 indicating a temporal change in the cycle time from the last maintenance time, and an indication 952 indicating a temporal change in the mold surface temperature from the last maintenance, sectioned at the maintenance intervals. In the indications 951, 952, "present" indicates a change in the value of the count data from the previous maintenance time to the latest count data, and "earlier period" indicates, regarding the count data obtained before the previous maintenance, a change in the value of the count data from the last maintenance time to the next maintenance time. The "before the previous maintenance" is not limited to "immediately before the previous maintenance", and may be any time before the previous maintenance.

The count data being sectioned at the maintenance intervals as described above allow various states during molding between maintenances to be grasped at a glance.

Figure 12:
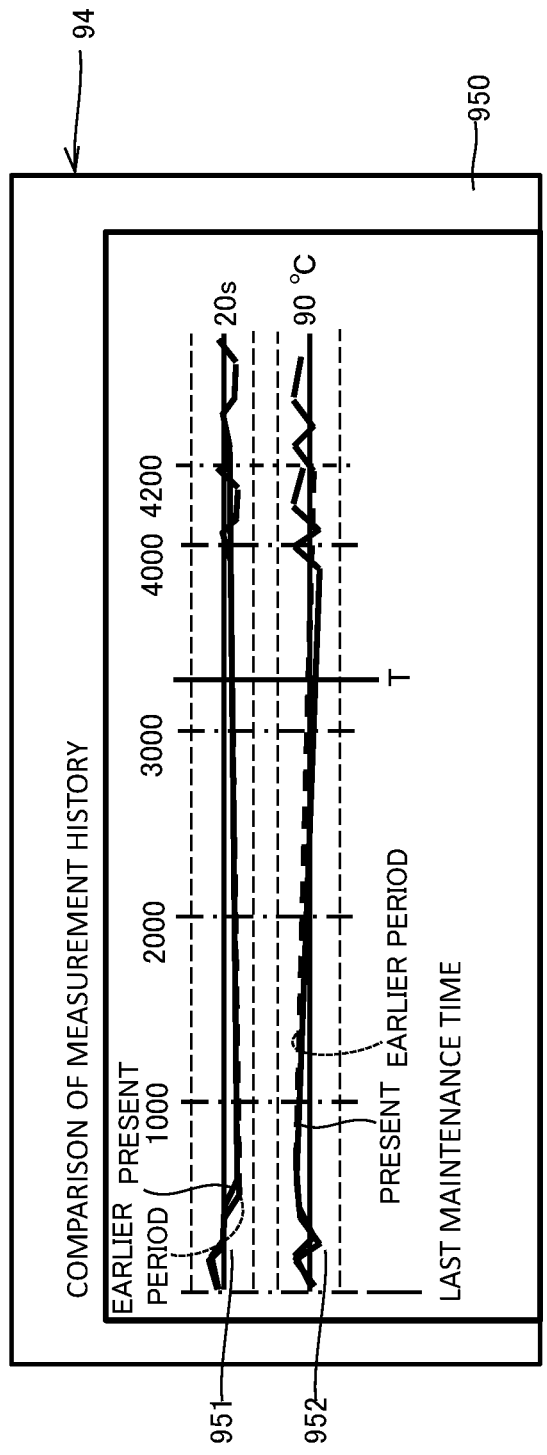
FIG. 12 is a schematic diagram showing an example of a display screen displayed on the user terminal by the management device.

An example of displaying the count data in a comparable manner for each predetermined period is displaying the count data in a plurality of periods so as to be overlapped with each other, with the reference timings such as maintenance times being made to coincide each other, as shown in FIG. 12. In the example of FIG. 12, a temporal change in the cycle time and a temporal change in the mold surface temperature from the previous maintenance time to the latest count data, are displayed so as to be overlapped with a temporal change in the cycle time and a temporal change in the mold surface temperature, regarding the count data obtained before the previous maintenance, from the last maintenance time to the next maintenance time, respectively.

This allows a change in the behavior of data to be grasped at a glance. In the example of FIG. 12, the behaviors of data almost match until the lapse of time T from the previous maintenance time, but the divergence of data increases after the lapse of time T. This situation may allow estimation of deterioration of the mold 3. Moreover, this situation can be used for consideration of a timing of next maintenance.

The reference timing is not limited to the maintenance time. In another example, the reference timing may be a specific date, or a specific value of count data accumulated from the last maintenance. The "displaying in a comparable manner" is not limited to displaying in an overlapping manner. In another example, "displaying in a comparable manner" may be displaying with a specific common mark being applied for each reference timing.

The display is not limited to the examples shown in FIGS. 11, 12. In another example, the processor 81 may display, in a comparable manner, values obtained from count data respectively linked to a plurality of pieces of user information that are designated. Alternatively, the processor 81 may display, in a comparable manner, values obtained from count data with respect to different types of molds. Still alternatively, the processor 81 may display, in a comparable manner, count data selected according to combinations of user information, molds, and the like. When the count data is linked to the various kinds of information obtained from the user terminal 9, these pieces of information can be displayed as parameters as described above. Thus, data useful for considering various issues such as production management, maintenance plan, and staffing, are outputted.

The display screen 920 may further include a button 934 for instructing determination of a timing of next maintenance. That is, as another example of display of a screen including the count result in the process using the data accumulated in the count information DB 822, the processor 81 may perform determination of a timing of next maintenance.

The reference number of cycles corresponding to the timing of next maintenance is stored in the memory 82 of the management device 8. The greater the reference number of cycles is, the longer the period until the next maintenance. The smaller the reference number of cycles is, the shorter the period until the next maintenance. That is, determining the timing of the next maintenance is determining whether or not the reference number of cycles stored in the memory 82 is appropriate.

As an example, when the frequency of performing the indication 943 shown in FIG. 11 becomes higher than or equal to a threshold, the processor 81 determines that the stored reference number of cycles is great, i.e., that the maintenance time should be advanced. This prevents defect of the mold 3 in advance.

Meanwhile, when a period, during which a divergence, from the boundary value, of a value obtained from the past count data is great, is shorter than or equal to a threshold, the processor 81 may determine that the stored reference number of cycles is small, i.e., that the maintenance time should be delayed. This inhibits excessive maintenance, thereby inhibiting reduction in productivity.

In still another example, the process using the data stored in the count information DB 822 may be a process of transmitting the data displayed on the display screen 920, 940, or 950 to another device. Examples of the other device may include a device for maintenance management of molding, a device for production management, and a device for evaluating operators. Meanwhile, the process using the data stored in the count information DB 822 may be a process of transferring, as an input value, the aforementioned data to a server or the like, which has been subjected to machine learning so as to receive count data as an input value and output, as an output value, a predicted value of an appropriate maintenance time, an appropriate set value, and the like, and transmitting the obtained output value. The above process enables the data accumulated in the management system 100 to be effectively used in various situations.

In the above embodiment, the device, whose display screen is imaged by the user terminal 9 and which is used by the management device 8 for management of the mold 3, is not limited to the counting device 1 only, and may be peripheral equipment used for molding in addition to the counting device 1. The peripheral equipment is a device for molding, other than the molding machine 6 to which the mold 3 is mounted. The peripheral equipment includes at least one of a material dryer, a material transporter, a mold temperature controller, a medium temperature controller, a mold chiller, a mold cooler, a blender, and a grinder.

In this case, the processor 81 reads out, from the screen template table 823, a screen template corresponding to the peripheral equipment whose display screen is imaged. Then, the processor 81 reads out prescribed information from a prescribed position by using the read screen template, thereby obtaining read data. The read data is linked to the count data and accumulated in the count information DB 822. Thus, the count data can be associated with various kinds of data, thereby realizing versatile management of the mold 3.

The reading process of recognizing characters in the image data may be performed on the user terminal 9 side. In this case, the data D2 includes the read data instead of the image data. Thus, the size of the data D2 is reduced, thereby reducing the communication load.

<3. Additional Note>

The present invention is not limited to the embodiment described above, and various modifications are possible.

The invention claimed is:

1. A management system, comprising:
a molding machine having a first mold and a second mold for injection molding, wherein a molding material is injected into a space between the first mold and the second mold to form a product;
a counting device configured on a side surface of the first mold of the molding machine to obtain a count value of a number of injection moldings of the product formed by the molding machine; and
a management device comprising a memory and a processor,
the processor being configured to execute a calculation process of calculating one or more index values by using a first value and one or more second values, the first value being the count value acquired from the counting device, the one or more second values being reference values that are stored in the memory and are used for determining a next maintenance time, the one or more index values being able to be used for determining the next maintenance time, and
the processor is configured to further execute an output process of outputting parameters, which are obtained from the count values in a first period and a second period, in a time-series manner in which starting points of the first period and the second period are made to coincide each other,
wherein the first period is a period from a last maintenance time, and
wherein the second period is a period from a first maintenance time before the last maintenance time to a second maintenance time next to the first maintenance time.

2. The management device according to claim 1, wherein the index values include the number of injection moldings that can be performed until the next maintenance time.

3. The management device according to claim 1, wherein the index values include the number of injection moldings from a last maintenance time.

4. The management device according to claim 1, wherein the processor is configured to further execute a determination process of determining the next maintenance time, based on the parameter obtained from the count value in the first period and on the parameter obtained from the count value in the second period.

5. A calculation method for a management system capable of communicating with a counting device configured to obtain a count value of a number of injection moldings of a molding machine for injection molding,
the calculation method including:
for each injection molding of the number of injection moldings, injecting into the molding machine having a first mold and a second mold, wherein the molding material is injected into a space between the first mold and the second mold of the molding machine to form a product;
for each injection molding of the number of injection moldings, capturing a count using the counting device, wherein the count corresponds to a transition from an open state of the molding machine to a closed state of the molding machine and a return to the open state to form the product, and
wherein the counting device is configured on a side surface of the first mold of the molding machine to obtain a count value for the number of injection moldings performed by the molding machine;
determining the count value for the number of injection moldings based on each captured count within the counting device;
calculating one or more index values by using a first value and one or more second values, the first value being the count value acquired from the counting device, the one or more second values being reference values that are stored in a memory and are used for determining a next maintenance time, the one or more index values being able to be used for determining the next maintenance time, and
outputting parameters, which are obtained from the count values in a first period and a second period, in a time-series manner in which starting points of the first period and the second period are made to coincide each other,
wherein the first period is a period from a last maintenance time, and wherein the second period is a period from a first maintenance time before the last maintenance time to a second maintenance time next to the first maintenance time.

* * * * *